Patented Oct. 22, 1935

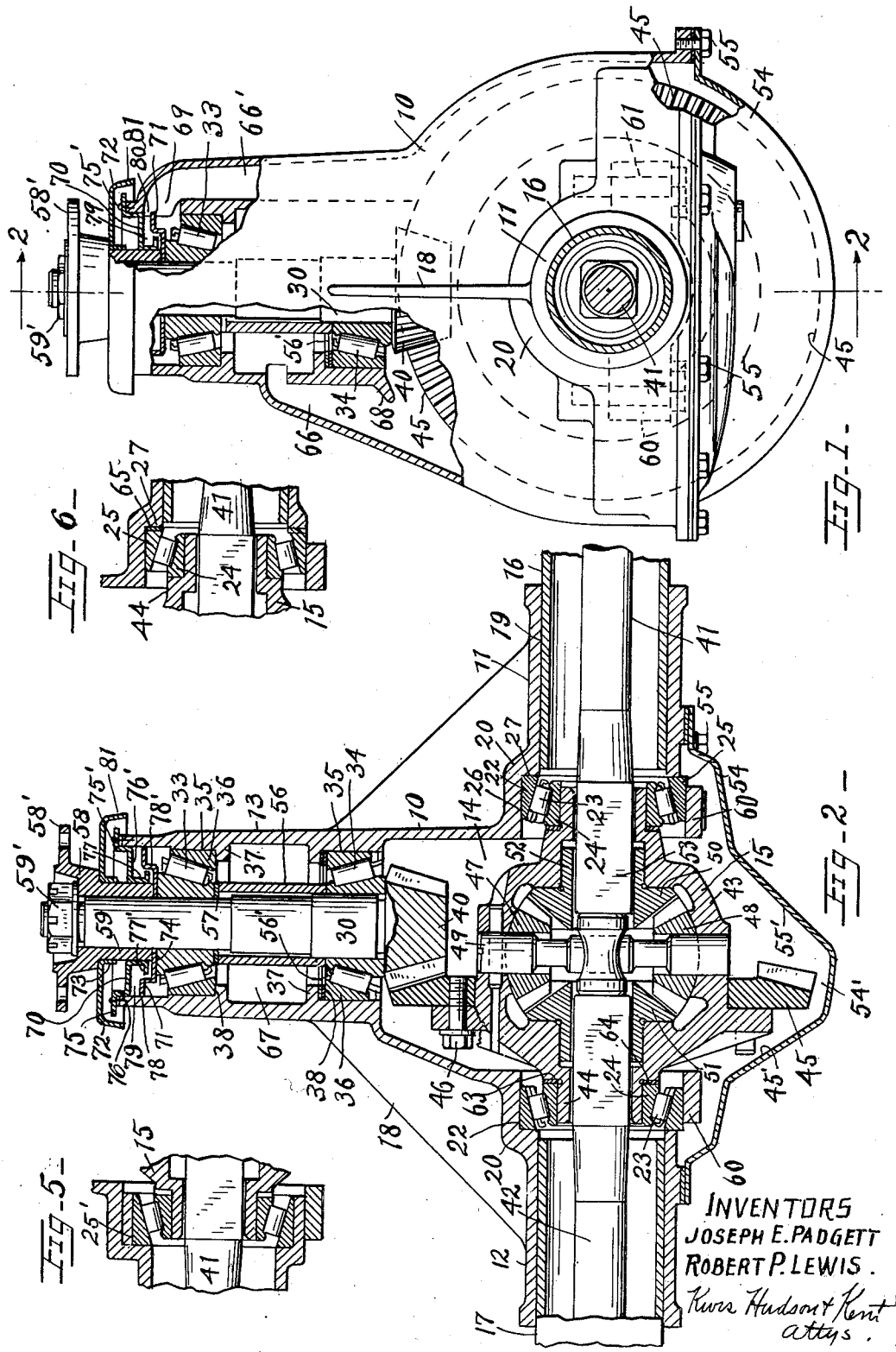

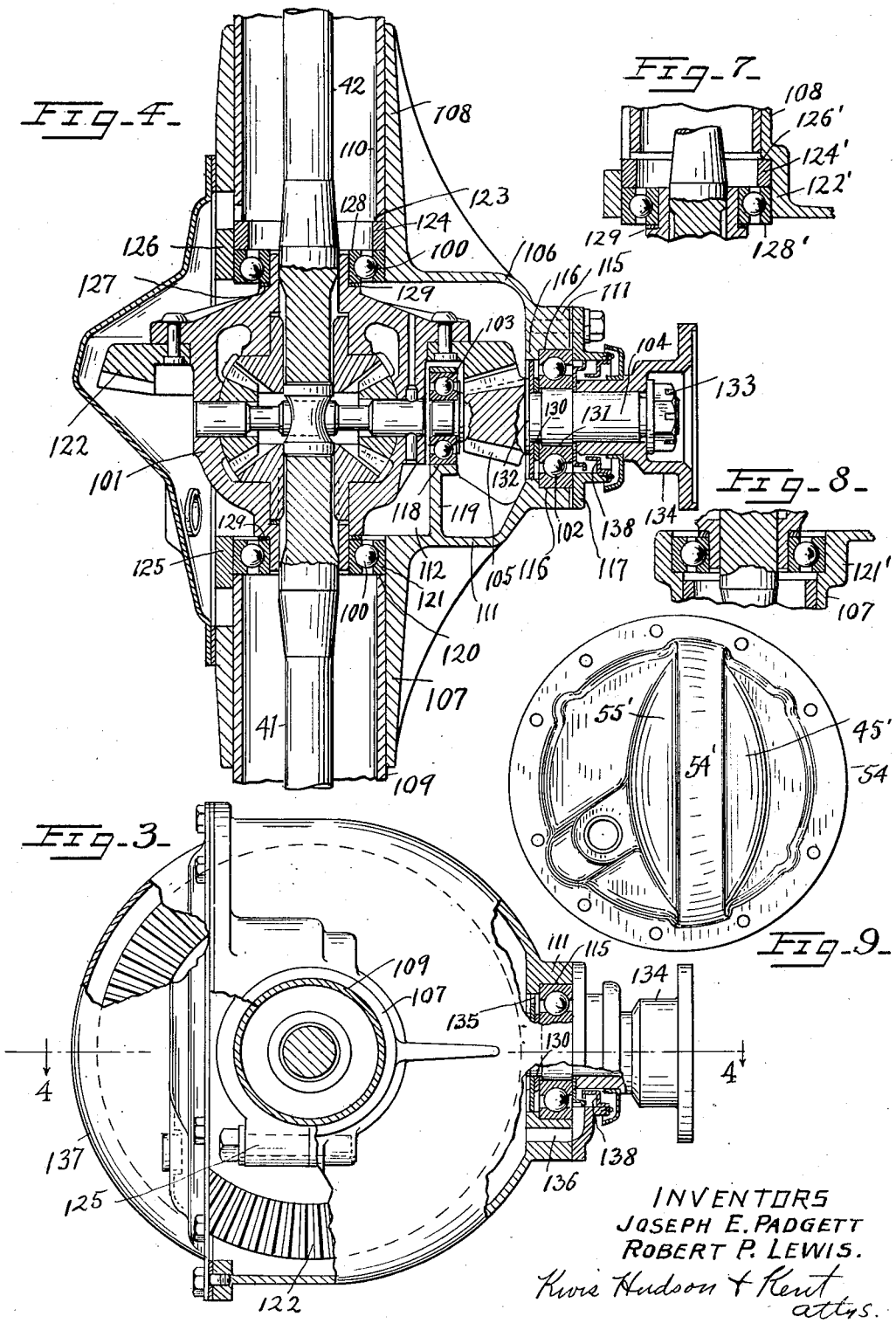

2,018,188

UNITED STATES PATENT OFFICE 2,018,188

DRIVE AXLE

Joseph E. Padgett and Robert P. Lewis, Toledo, Ohio

Original application January 5, 1932, Serial No. 591,098, now Patent No. 1,968,618, dated July 31, 1934. Divided and this application August 17, 1932, Serial No. 629,170

5 Claims. (Cl. 184—11)

This invention relates generally to driving axles for motor vehicles, and more particularly to an improved construction for such axles.

This application is a division of our earlier application Serial No. 591,098, filed January 5, 1932, now Patent No. 1,968,618, issued July 31, 1934.

An object of our invention is to provide a vehicle driving axle embodying novel means for obtaining a desired distribution or circulation of lubricant in the gear housing of the axle.

Another object of our invention is to provide a vehicle driving axle embodying novel means for preventing the escape of lubricant from the gear housing.

A further object of this invention is to provide a vehicle driving axle having a gear housing constructed with a passage for returning lubricant to the differential chamber from the pinion shaft bearings, and also having lubricant retaining means disposed around the pinion shaft in spaced relation forming a leakage collecting chamber, and wherein such collecting chamber communicates with the return passage.

It is also an object of this invention to provide a vehicle driving axle, of the type referred to, wherein a removable cover forming a portion of the wall of the differential chamber is shaped to cooperate with the differential gear in forming an efficient lubricant distributing means.

Other objects and advantages of our invention will be apparent from the following description, when taken in conjunction with the accompanying sheets of drawings, wherein, Fig. 1 is a side elevational view, with portions broken away, showing a vehicle driving axle constructed according to our invention.

Fig. 2 is a sectional plan view thereof taken substantially on the line 2—2 of Fig. 1.

Fig. 3 is a side elevational view with portions broken away showing another vehicle driving axle constructed according to our invention.

Fig. 4 is a sectional plan view thereof taken substantially on line 4—4 of Fig. 3.

Fig. 5 is a partial sectional view showing another form of bearing seat.

Fig. 6 is a view showing another shim arrangement contemplated by our invention.

Figs. 7 and 8 are sectional views showing other arrangements of bearings and bearing seats, and Fig. 9 is an inside elevation of the cover for the gear chamber.

For a more detailed disclosure of our invention, reference will now be made to the accompanying drawings showing vehicle driving axles, however, it should be understood that the drawings are for the purposes of illustration and that our invention is not to be regarded as limited to the particular construction or arrangements shown therein, but may be embodied in various other designs or types of construction.

As illustrated in Figs. 1 and 2 of the drawings, our improved axle is provided with a gear casing 10, which is formed as a metal casting having integral oppositely extending projections 11 and 12, and an integral projection 13 extending in angular relation, preferably at right angles to a plane passing through the common axis of the projections 11 and 12. The integrally formed projections 11, 12 and 13 are hollow and communicate with the chamber 14 of the casing in which the gear assembly 15 is disposed.

The projections 11 and 12 are constructed so as to form mounts for the axle tubes 16 and 17, which extend outwardly from the casing 10, and these projections may be reinforced by the provision of suitable ribs 18. The axle tubes may be secured to the projections in any suitable manner, such as by providing the projections with openings 19 into which the axle tubes extend, as shown in Fig. 2 of the drawings. After being assembled into the openings of the projections, the ends of the axle tubes may be held against withdrawal by appropriate means, such as by welding the tubes to the projections, or by the use of suitably located rivets.

As shown in the drawings, the projections 11 and 12 are preferably provided with an enlargement 20, adjacent the junction thereof with the body of the casing 10, and in accordance with our invention, each of these enlargements is provided with a pair of seats for positioning and supporting the bearings 22, in which the gear assembly 15 is rotatably mounted. In this instance, the bearings 22 are of the type known as roller bearings, each comprising a circumferentially extending series of tapered rollers 23, arranged between inner and outer annular races 24 and 25. The bearing seats preferably constitute an integral part of the cast metal forming the projections, as shown in Fig. 2, but in instances where the casing is of relatively soft cast metal, the bearing seats may be a ring 25' of harder material mounted in the opening of the projections, as indicated in Fig. 5. In the preferred construction, one seat of each pair comprises a cylindrically formed surface 26 which is engaged by the outer periphery of the bearing race 25. The other seat of each pair comprises a radially disposed annularly extending shoulder 27 which is engaged by an end face of the bearing race 25.

From the arrangement just described it will be seen that the seats provided for each of the bearings 22, are located inwardly of the inner ends of the axle tubes, and are carried directly by the integrally formed projections, so that the latter absorb both the radial load and the end thrust transmitted through the bearings. In other words, the cylindrical seats 26 support and position the bearings 22 coaxially of the projections 11 and 12, and the radially disposed seats 27 support the bearings against end thrust and position the same with respect to the axis of the projection 13.

The projection 13 which, as stated above, is formed, as an integral part of the casing 10, is arranged to project forwardly of the latter, and provides a mount for the pinion shaft 30. This projection or mount is of substantially tubular shape, having an opening at its forward end, and also having spaced seats therein for the roller bearings 33 and 34 which support the pinion shaft. Each of these seats comprises a cylindrical surface 35, which is engaged by the outer periphery of the outer bearing race 36, and a radially disposed annular extending shoulder 37 which is engaged by an end face 38 of the outer bearing race. In this arrangement the cylindrical seat 35 absorbs the radial load transmitted through the bearing, and positions the latter in concentric relation to the axis of the projection 13. The radially disposed shoulders 37 absorb the end thrust of the bearing, and assist in positioning the latter axially of the projection 13. As in the case of the bearings 22, referred to above, the seats 35 and 37 are preferably formed as an integral part of the pinion-shaft mount or projection, so that the radial load and end thrust of the bearings 33 and 34 will be absorbed by the integrally cast gear casing.

The gear assembly 15, which we have stated is housed within the casing 10, may be of any form of construction which is suitable for the transmission of power from the pinion 40, mounted at the inner end of the pinion shaft 30, to the axle shafts 41 and 42 which extend coaxially of the axle tubes 16 and 17. As herein illustrated, this gear assembly or power transmitting device is provided with a frame or differential carrier 43 having oppositely extending sleeve-like projections 44 which are supported in the inner races of the bearings 22. A main bevel gear 45 is secured to the frame 43 by any suitable means, such as the bolts 46, and meshes with the driving pinion 40. As is usual in power transmitting devices of this kind, the frame 43 supports a train of differential gearing comprising a pair of bevel gears 47 and 48, which are rotatably supported upon the pin 49, and which mesh with a second pair of bevel gears 50 and 51. The bevel gears of the latter pair are each formed with a sleeve portion 52, which is journaled in the frame 43, and which has driving connection with the inner end of one of the axle shafts. This driving connection may be a spline connection, but, in this instance, is formed by providing square portions 53, at the inner ends of the axle shafts, which engage in correspondingly shaped recesses formed in the gear sleeves 52.

In order that the gear assembly 15 may be inserted into or removed from the gear chamber of the casing 10, we construct the latter with an opening through the rear wall thereof opposite the projection 13. This opening is of suitable size and shape for the purpose intended and is closed by a cover 54, which may be formed as a sheet metal stamping and may be removably held in place by the bolts 55. As will be explained hereinafter, this cover is so shaped that it assists in efficiently distributing the lubricant of the gear chamber to the desired points.

In assembling our axle, the pinion shaft 30 with the bearing 34 assembled thereon, is first inserted through the opening of the casing and positioned coaxially within the projection 13. A spacing sleeve 56 and the bearing 33 are next mounted upon the pinion shaft by being inserted into the projection from the forward end thereof. Positioning of the pinion 40 relative to the common axis of the axle shafts for most efficient cooperation with the main gear 45, as well as adjustment of the bearings 33 and 34, are obtained by providing a shim 56' of suitable form and appropriate thickness, between the outer race of the bearing 34 and the seat 37, and another such shim 57 between the inner race of the bearing 33 and the forward end of the spacing sleeve 56. Although we prefer the shim arrangement just described, it may be desirable in some instances to locate the shim 56' between pinion 40 and the inner race of the bearing 34, instead of between the outer race of this bearing and the shoulder 37 as shown in Fig. 2 of the drawings.

A power transmitting coupling may be provided for our driving axle, adjacent the forward end of the projection 13, by mounting the shaft member 58 on the forward end of the pinion shaft. The shaft member is provided with a flange 58' for connection with a universal joint (not shown), and a sleeve portion 59 extending inwardly toward the bearing 33. A retaining nut 59' is threaded upon the forward end of the pinion shaft, as shown in Fig. 2. When tightened against the shoulder of the shaft member 58, this nut causes the parts of the pinion shaft assembly to be drawn together between the shaft member 58 and the pinion 40 with the inner race of the bearing 33 abutting against the shim 57. The action of the nut, coupled with the fact that the outer race of the bearing 33 abuts against the seat 37, causes the outer race of bearing 34 to abut against the shim 56' with the result that the pinion is correctly positioned axially of the projection 13. From the assembly and arrangement just described, it will be seen that the shims 56' and 57 afford simple and convenient means for initially positioning or subsequently adjusting the pinion 40 and the bearings 33 and 34.

After the pinion shaft has been assembled in the projection 13, as just described, the gear assembly 15, with the bearings 22 mounted upon the sleeve portions 44 thereof, is inserted through the rear opening of the casing 10, bringing the main gear 45 into mesh with the pinion 40 and the outer races of the bearings 22 into engagement with the seats 26 and 27. For removably mounting the gear assembly in this position, we provide the bearing caps 60, which are secured to the casing by means of the bolts 61. These bearing caps are so shaped that they cooperate with the seats 26 and 27 in supporting and positioning the bearings 22.

In order that the gear assembly 15 may be properly positioned with respect to the axis of the pinion shaft 30, so that efficient cooperation is had between the main gear 45 and the pinion 40, we provide novel and efficient centering means which constitutes an important feature of our invention. This positioning means for the gear assembly 15, consists in providing the frame 43, of the latter, with shoulder portions 63 at the inner ends of the sleeve portions 44. These shoulder portions are designed to cooperate with the inner ends of the inner bearing races 24 to thereby position the gear assembly with respect to the axis of the projection 13. Usually the shoulders 63 do not directly engage the ends of the bearing races 24, but engage a shim 64, of suitable form and appropriate thickness, which is interposed therebetween. If desired, however, the shoulders 63 may directly engage the bearing races 24, in which case suitable shims 65, equivalent to the shims 64, are interposed between the outer races 25 and the seats 27, as shown in Fig. 6. Since the bearings 22 are, themselves positioned by means of the radially disposed seats 27, it will be seen that the cooperation provided between the bearings and the shoulder portions 63, affords a simple and efficient means for correctly positioning the gear assembly. Moreover, it will be seen that very accurate initial positioning or adjustment of the gear assembly, and of the bearings 22, can be had, as well as subsequent adjustment for wear, by simply selecting shims of appropriate thickness.

After the various parts of our axle have been assembled in the manner described, the cover 54 is secured in place and the chamber of the gear casing is charged with a quantity of lubricant. It is well understood in this art that during the operation of axles of the type disclosed herein, a portion of the lubricant contained in the gear chamber adheres to the main gear of the differential carrier and is to some extent distributed thereby. To improve the lubricant distributing action of the main gear 45 we have constructed the cover 54 of such shape that it increases the capacity of the main gear for picking up lubricant, and also serves to direct the flow of the lubricant so that an adequate supply is delivered to the bearings 22 and to the interior of the carrier 43. As shown in Figs. 2, 3 and 9, this cover is substantially in the form of a shallow pan having a marginal flange through which the bolts 55 extend, and a relatively deep arcuate recess or channel 54' in the bottom wall of the pan into which the toothed portion of the gear 45 extends. The recess 54' is so shaped that its bottom wall is substantially concentric with the gear 45 but is of slightly larger radius to afford clearance. The side walls 45' and 55' of the recess slope in divergent relation, as shown in Fig. 2, for the purpose of directing the lubricant to the bearings 22 and to the cooperating gears disposed in the carrier 43. It will be noted that the bearing 22, which is associated with the projection 11, is more remote from the gear than is the bearing associated with the projection 12, and that the sloping side wall 55' is made correspondingly longer so that the desired lubricant distribution will be obtained.

During the operation of our vehicle axle, some of the lubricant of the gear chamber is picked up by the gear 45 and is splashed or thrown into the recess 54'. I have found that as this lubricant flows away from the rotating gear, it is actually directed against the bearings 22 and the carrier 43 by the sloping walls 45' and 55'.

To insure adequate lubrication of the bearings in the projection 13, and to obtain an actual circulation of lubricant therethrough, we provide means whereby lubricant will be delivered into the projection by the gear 45, and will be readily returned therefrom to the gear chamber. We attain this circulation by providing the gear casing with a lubricant passage 66 leading into the projection 13, and with a return passage 66' for carrying the lubricant from the projection back to the gear chamber. The inlet passage 66 communicates with the lubricant chamber or reservoir 67 in the projection 13, from which reservoir lubricant is supplied directly to the bearings 33 and 34. An elevated lip or dam 68, preferably formed integral with the gear casing, assists in collecting lubricant and causing the same to flow into the reservoir 67.

The return passage is located below the center line of the pinion shaft 30, preferably along the bottom of the projection so that gravity will assist in returning the lubricant to the gear chamber. This passage may be a conduit of any suitable type, but is preferably integrally formed during the casting of the casing 10. As shown in Fig. 1 of the drawings, this passage is so arranged that the inlet and 69 thereof communicates with the interior of the projection 13 at a point forwardly of the bearing 33, with this arrangement, the lubricant, delivered into the projection, is returned to the gear chamber only after it has passed through the pinion shaft bearings. It will be seen that by the means just described, we provide adequate lubrication for the pinion shaft bearings, since a continuous flow of lubricant will be maintained through the projection 13 during the operation of the vehicle.

As another important feature of our invention, we have provided novel sealing means for preventing the escape of lubricant, or the entry of foreign material, around the pinion shaft 30 at the forward end of the projection 13. This sealing means consists of a plurality of annular members which surround the pinion shaft, and which are so constructed and arranged as to effectively prevent the escape of lubricant or the entry of foreign material. These members are preferably constructed as sheet metal stampings and include an intermediate member 70, and inner and outer members 71 and 72 disposed on opposite sides of the intermediate member. The inner and outer members are rotatable with the shaft member 58, the outer member preferably having an axially extending sleeve portion 73 pressed onto the sleeve portion 59 of the shaft member, and the inner member preferably having a flange portion 74 gripped between the inner end of the sleeve portion 59 and the inner race of the bearing 33. The intermediate member 70 is formed with a radially extending flange 75 which may be secured to the forward end of the projection 13, as by means of suitable screws 75', and a cup-shaped portion 76, which telescopes into the opening of the projection 13. The bottom of this cup-shaped portion provides a radially disposed closure wall 76', extending between the inner surface of the opening of the projection and the outer surface of the sleeve portion of the rotatable shaft member 58. As shown in Fig. 2, the closure wall 76' is provided with an integral sleeve portion 77, which surrounds the rotatable shaft member 58 and which extends axially inwardly toward the pinion 40. At its inner end the sleeve portion 77 terminates in a radially disposed annular flange 77' which cooperates with the rotatable inner member 71 in a manner presently to be described.

The member 71 which, as stated above, is disposed inwardly of the member 70 and is rotatable with the shaft member 58, is in the form of a disc of substantially the same diameter as the opening of the projection 13, so that the peripheral edge 78 of the disc forms a relatively close seal with the inner surface of the opening. This rotatable sealing disc is also provided with an integral sleeve portion 78' extending axially outwardly away from the bearing 33 and surrounding the radially disposed flange 77' of the stationary sealing member 70. The diameter of the sleeve portion 78' is preferably such that very small clearance is provided between the same and the flange 77' of the stationary sealing member. When the sealing member 70 and 71 are assembled in place in the forward end of the projection 13, as shown in Fig. 2 of the drawings, an intermediate collecting chamber 79 is formed therebetween.

From the construction and arrangement of the members 70 and 71 as just described, it will be seen that for any lubricant to escape from the forward end of the projection 13, such lubricant must pass between the peripheral edge 78 and the wall of the projection into the chamber 79. From this chamber the escaping lubricant must reverse its direction of travel and pass between the peripheral edge of the radially disposed flange 77' and the inner surface of the sleeve portion 78', and then again reverse its direction of travel and pass between the sleeve portion 77 and the shaft member 58. It will be noted that since the sealing member 71 is rotatable, the lubricant attempting to pass between the sleeve portion 78 and the flange 76, will meet with considerable resistance because the tendency will be for centrifugal force to throw this lubricant outwardly toward the inner surface of the projection 13, and to some extent into the return passage 66'.

To assist the sealing means in preventing the escape of the lubricant, we have arranged the return passage 66', referred to above, so that the inlet end thereof also communicates with the chamber 79, through the passage 80, as shown in Fig. 1. During the operation of our axle, such lubricant as may pass around the peripheral edge 78, will be collected in the chamber 79 and will be delivered into the return passage 66 through the opening 89, and conveyed back to the gear chamber. Thus it will be noted that the communicating passage 80 functions as a means for draining the chamber 79, and, in addition, prevents lubricant pressure from building up in this chamber, which might otherwise result in some of the lubricant being forced outwardly between the sleeve portion 77 and the shaft member 58.

As explained above, the intermediate member 70 is provided with a radially extending flange 75 which is secured to the forward end of the projection 13, and in this connection it should be noted that this flange protrudes outwardly beyond the outer surface of the projection 13. This protruding portion of the flange 75 cooperates with the rotatable outer member 72 to exclude water and other foreign material from entering the projection through the pinion shaft opening. The outer member, as stated above, is rotatable with the shaft member 58 and, as shown in Figs. 1 and 2, is substantially in the form of a cup having its bottom wall extending radially outwardly from the shaft member 58 and terminating in the annular angularly disposed flange or skirt portion 81 which telescopes around the forward end of the projection 13 and also around the protruding portion of the flange 75. With the arrangement just described it will be seen that any water or other foreign material which may creep forwardly along the outer surface of the projection 13, will be deflected outwardly by the annular protruding portion of the flange 75. As this foreign material drips from the protruding flange portion it will be caught by the rotating telescoping skirt portion 81 and thrown outwardly from the latter by centrifugal force. In telescoping around the forward end of the projection 13, the outer member 72 also acts as a shield and deflector which prevents foreign material from being splashed or otherwise directed into the pinion shaft opening.

In Figs. 3 and 4 of the drawings, we have shown another vehicle driving axle embodying our invention, but which differs in some respects from the driving axle just described. In this latter form of our axle, the bearings 100 which support the gear assembly 101, and the bearings 102 and 103 which support the pinion shaft 104, are of the annular ball type. The axle shown in Figs. 3 and 4 also differs from the one shown in Figs. 1 and 2, in that the bearings 102 and 103 are arranged on opposite sides of the driving pinion 105, to form what is known in the art as a straddle mount for the pinion shaft. As in the arrangement previously described, we provide a gear casing 106 having integrally formed aligned extensions 107 and 108, in which the shaft tubes 109 and 110 are mounted. Likewise, we provide a forwardly extending pinion shaft mount 111, which is formed as an integral part of the gear casing. The integrally formed projections 107, 108 and 111 are hollow, as shown in Fig. 4, and communicate with the interior of the gear chamber formed in the casing 106.

In accordance with our invention, seats are provided on the projections 107, 108 and 111 for positioning the bearings 100, 102 and 103, and for absorbing the loads transmitted therethrough. The seats for the bearings 100 consist of a part of the inner cylindrical surfaces of the projections 107 and 108. The seat for the bearing 102 comprises a cylindrical surface 115, formed in the projection 111 adjacent the forward end thereof, and a radially disposed integral shoulder portion 116 which cooperates with the removable flange 117 for positioning the bearing 102 against axial displacement. The seat for the bearing 103 comprises a cylindrical surface 118 formed in the web 119 which extends into the gear chamber 106.

As shown in Fig. 4, the inner end of the shaft tube 109 terminates short of the inner end of the opening provided in the projection 107, so that the inner end of this shaft tube may constitute an abutment or shoulder 120, which is engaged by the outer race 121 of the bearing 100 for absorbing the end thrust transmitted through this bearing. The use of the inner end of the shaft tube, as a seat for the bearing 102, is feasible only when this bearing is of such size that its outside diameter is the same as the outside diameter of the shaft tube, as shown in Fig. 4, and, if desired, the same type of seats may be provided for the bearings 100, as are provided for the bearings 22 of Fig. 2 by simply forming the extension 107 and 108 with enlargements 121' and 122', as indicated in Figs. 8 and 7.

As stated above, the pinion shaft 104 is supported by a straddle mount, and in order to insert the gear assembly 101 into the gear chamber and to bring the main gear 122 into mesh with the pinion 105, without interference from the mount for the bearing 103, we have arranged the shaft tube 110 so that the inner end 123 thereof terminates considerably short of the inner end of the opening of the projection 108, as shown in Fig. 4. In other words, the shaft tube 110 does not extend into the projection 108 far enough to engage the bearing 100, when the gear assembly is properly positioned with respect to the axis of the pinion shaft. The space thus provided between the extreme inner end of the opening of the projection 108 and the inner end of the shaft tube 100, affords a clearance which permits the gear assembly to be inserted into or removed from the chamber in such a manner that the main gear 122 clears the bearing 103.

In introducing the gear assembly into the gear chamber and bringing the main gear into mesh with the pinion, one of the bearings 100 is brought into engagement with the inner end of the shaft tube 109 and into engagement with the seat provided by the inner surface of the projection 107. This assembly operation likewise brings the other bearing 100 into engagement with the seat provided at the inner end of the projection 108, and in spaced relation to the inner end of the shaft tube 110, as shown in Fig. 4. After the gear assembly is brought into the position illustrated in this figure, a spacing ring 124 of proper width is inserted between the inner end of the shaft tube 110 and the bearing adjacent thereto, so as to engage the outer race of this bearing. The spacer serves as an abutment which absorbs the axial thrust of the bearing 100 and positions the gear assembly with respect to the axis of the pinion shaft. The gear assembly is held in this position by the retaining caps 125 and 126 provided for the bearings 100, which caps are removably mounted adjacent the inner ends of the projections 107 and 108. The bearing cap 126 also engages the spacer ring 124 and serves to retain this member in place between the shaft tube 110 and the bearing 100.

When the projection 108 is formed with an enlargement at the inner end thereof, as shown in Fig. 7, the spacing ring 124' is interposed between the outer bearing race 128' and the seat or shoulder 126'.

As in the driving axle arrangement shown in Figs. 1 and 2, the frame of the gear assembly 101 is provided with shoulder portions 127 which cooperate with the inner races 128 of the bearings 100, to thereby correctly position the gear assembly within the gear chamber. As explained above, suitable shims 129 of appropriate thickness may be used in conjunction with these shoulders for the purpose of making an accurate initial assembly, or for making adjustments for wear. If desired, the shoulders 127 may directly engage the inner races of the bearings 100, and spacing shims may be applied to the outer bearing races, as shown in Fig. 6.

As indicated in Fig. 4, the bearing 102 is held in place by the seat 115 and by having its outer race held against the seat 116 by the flange 117. Correct positioning or adjustment of the pinion 105, in the axial direction of the mount 111, is obtained by the provision of a suitable shim 130 of appropriate thickness between the inner race 131 of the bearing 102 and the shoulder 132 of the pinion. A nut 133, on the forward end of the pinion shaft, clamps the shim 130 between the bearing race 131 and the shoulder 132, and also serves as a retaining means for the shaft member 134.

During the operation of the driving axle illustrated in Figs. 3 and 4, some of the lubricant contained within the gear chamber, adheres to the main gear 122 and is delivered by the latter to the pinion 105 and to the pinion shaft bearings 102 and 103. A circulation of the lubricant through the pinion shaft bearing 102 is obtained by providing the inlet passage 135, and a return passage 136 which conveys the lubricant from the forward end of the pinion shaft mount back to the gear chamber. The removable cover 137 which, as to construction and arrangement is substantially identical with the cover 54, assists in the delivery of lubricant to the bearings 100 and into the gear assembly 101. The escape of lubricant around the pinion shaft at the forward end of the projection 111, is prevented by the use of the sealing means 138 which is substantially identical with that described in detail in connection with Figs. 1 and 2.

It will now be readily understood, from the foregoing description and the accompanying drawings, that we have provided an improved driving axle construction embodying novel means for effectively distributing lubricant to the various parts of the device. It will also be seen that the novel form of packing means, which we have provided for preventing escape of lubricant around the pinion shaft, conserves the supply of lubricant in the gear casing and prevents undesirable dripping of lubricant from this part of the vehicle. Additionally, it will be seen that the outer telescoping member of the lubricant retaining means performs the important function of deflecting water and other foreign material away from the pinion shaft opening. Adequate lubrication of all of the various parts is obtained, by reason of the efficient lubricant distributing action produced by the novel cover structure and by the return passage. It will also be seen that a further advantage is attained in our novel construction, in that the lubricant return passage communicates with the collecting chamber, formed between the packing members of the lubricant retaining means, and thereby renders the retaining means more efficient in its action.

While we have illustrated and described the apparatus of our invention in a detailed manner, it should be understood, however, that we do not intend to limit ourselves to the precise details of construction and arrangements of parts illustrated and described, but regard our invention as including such changes and modifications as do not involve a departure from the spirit of the invention and the scope of the appended claims.

Having thus described our invention, we claim:

1. In a driving axle the combination of a housing having a gear chamber therein, a differential in said housing, bearings in said housing for rotatably supporting said differential, said housing having an opening in the wall thereof to admit said differential, lubricant in said chamber, and a cover closing said opening, said cover having integral angularly disposed portions against which a quantity of said lubricant is delivered by the rotation of said differential, said angularly disposed portions being arranged to deflect said quantity of lubricant and direct the same to said bearings and differential.

2. In a driving axle the combination of a housing having a gear chamber therein, a differential in said housing, bearings in said housing for rotatably supporting said differential, said housing having an opening in the wall thereof to admit said differential, lubricant in said chamber, and a cover closing said opening, said cover having an arcuate recess formed therein to operably receive a portion of said differential, the side walls of said recess being divergently inclined for directing to said bearings and to the gear portions of the differential lubricant which is thrown or carried into said recess by said differential portion.

3. In combination, a gear housing having bearings therein, a gear unit rotatable in said bearings and having an outwardly extending gear element, lubricant in said housing adapted to be picked up by said gear element, and means providing said housing with a recess into which a portion of said gear element extends, said recess having its side walls disposed to direct said lubricant toward said bearings.

4. In combination, a gear housing having a pair of laterally spaced bearings therein, a gear unit rotatably mounted in said bearings and having a gear element extending outwardly therefrom at a point intermediate said bearings, lubricant in said housing adapted to be picked up by said gear element, and means on said housing providing a recess into which a portion of said gear element extends, said recess having its opposite side walls divergently disposed to direct said lubricant toward said bearings.

5. In combination, an axle housing having bearings therein, a differential assembly rotatably supported in said bearings and having an outwardly extending gear element, lubricant in said housing, and a cover on said housing having a recess in which a portion of said gear element rotates, portions of said cover forming the sides of said recess being disposed to direct lubricant, which is picked up by said gear elements, toward said bearings.

JOSEPH E. PADGETT.
ROBERT P. LEWIS.